Aug. 30, 1955     G. D. HUNTER     2,716,476
NON-REPEAT MECHANISM FOR CLUTCHES
Filed Feb. 6, 1953     3 Sheets-Sheet 1

INVENTOR.
GEORGE D. HUNTER
ATTORNEYS

Aug. 30, 1955  G. D. HUNTER  2,716,476
NON-REPEAT MECHANISM FOR CLUTCHES
Filed Feb. 6, 1953  3 Sheets-Sheet 2

INVENTOR.
GEORGE D. HUNTER
BY C. F. Parker & R. C. Johnson
ATTORNEYS

Aug. 30, 1955   G. D. HUNTER   2,716,476
NON-REPEAT MECHANISM FOR CLUTCHES
Filed Feb. 6, 1953   3 Sheets-Sheet 3

INVENTOR.
GEORGE D. HUNTER
BY
ATTORNEYS

United States Patent Office 2,716,476
Patented Aug. 30, 1955

2,716,476

NON-REPEAT MECHANISM FOR CLUTCHES

George D. Hunter, Des Moines, Iowa, assignor to Deere Manufacturing Co., Dubuque, Iowa, a corporation of Iowa Application February 6, 1953, Serial No. 335,483

11 Claims. (Cl. 192—62)

The present invention relates generally to agricultural implements and the like and is particularly concerned with implements having power lift mechanism of the type including self-interrupting clutches driven by ground wheels or the like.

The object and general nature of the present invention is the provision of non-repeat mechanism incorporated in the clutch mechanism, preferably within the housing or casing of the clutch, whereby not only the clutch parts but also the non-repeat mechanism parts are enclosed and thereby protected from dirt, dust and the like and, moreover, are not likely to be affected in operation by trash and the like. Further, it is an important feature of this invention to provide non-repeat mechanism that is simple and sturdy, comprises few parts and wherein the latter may be inexpensively manufactured yet held to close tolerances.

These and other objects and advantages of the present invention will be apparent to those skilled in the art after a consideration of the following detailed description, taken in conjunction with the accompanying drawings, in which.

Figures 1, 2, 5, 6:
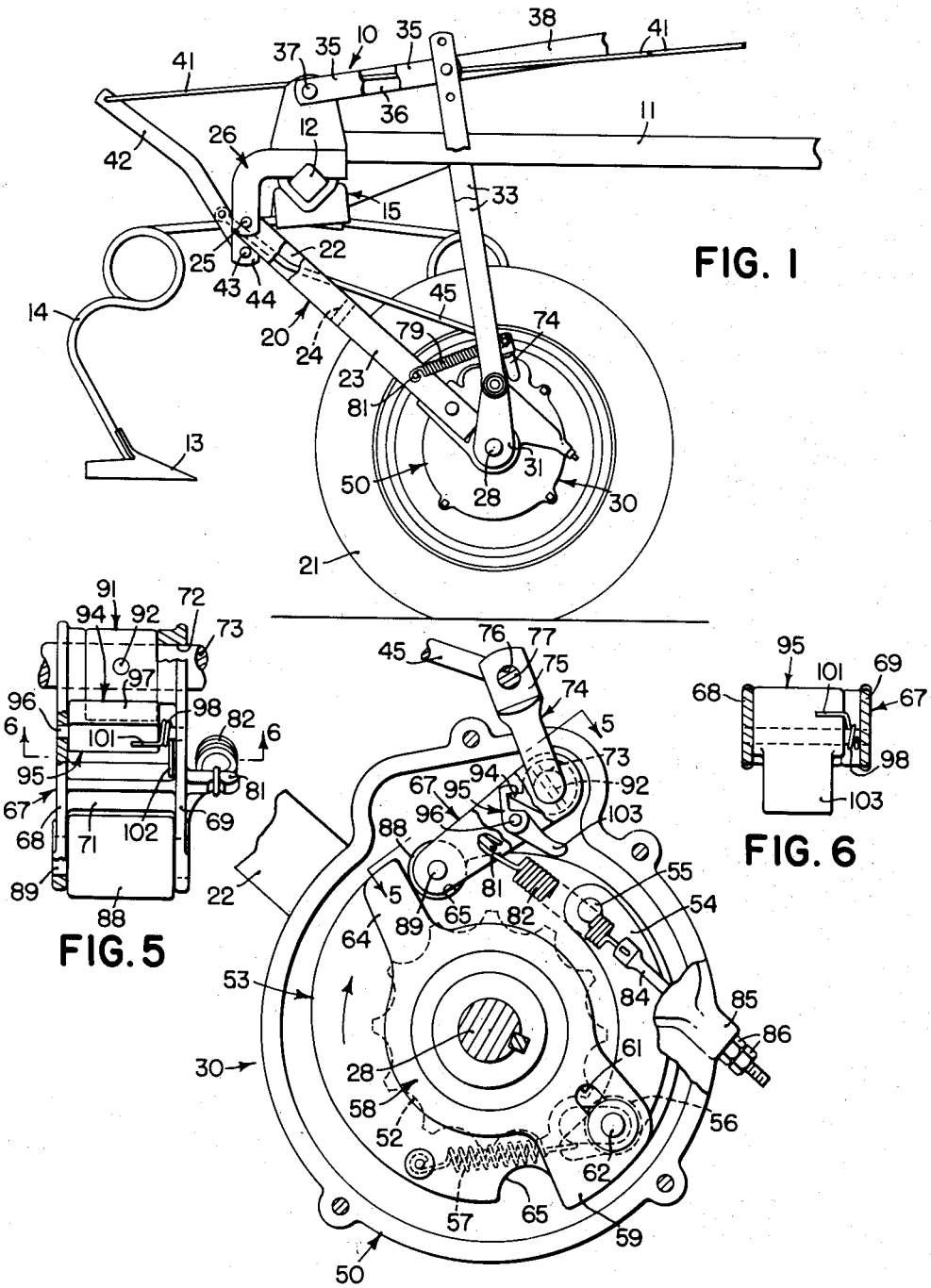
Figure 1 is a fragmentary side view, showing an agricultural implement of the type including a ground wheel operated power lift clutch, the implement being shown in its raised or transport position.
Figure 2 is an enlarged detail view of the clutch mechanism and the associated non-repeat mechanism, the several parts being shown in the positions they occupy when the implement is arranged for transport.
Figure 5 is a sectional view taken generally along the line 5—5 of Figure 2.
Figure 6 is a sectional view taken generally along the line 6—6 of Figure 5.

Referring now to the drawings, particularly Figure 1, the agricultural implement, which is shown fragmentarily in Figure 1, that has been chosen to illustrate the principles of the present invention is a tractor drawn two-wheel cultivator similar to that shown in U. S. Patent 2,385,950, issued October 2, 1945, to which reference may be made if necessary. Briefly, the implement 10 is shown as including a frame made up of one or more generally fore-and-aft extending frame bars 11 to the rear portion of which is secured in any suitable way a generally transversely arranged tool bar 12, usually square in cross section. Ground-working tools of various kinds may be secured in different positions to the tool bar 12 by any suitable clamping means, and for the purposes of illustrating one form of tool means, I have shown in Figure 1 a plurality of shovels 13 fixed to the lower end of spring standards 14 that at their upper ends are secured, as by clamps 15, to the tool bar 12. As best shown in said prior patent, the implement frame 11 is relatively wide so as to accommodate a considerable number of ground-working tools and, for raising and lowering the tools into and out of their transport position, a pair of swingable members 20 and ground wheels 21 are provided. Each swingable member 20 includes a pair of laterally spaced apart bars 22 and 23 suitably connected together as at 24, and swingably connected, as at 25, with brackets 26 that are clamped to the tool bar 12, there being a set of brackets 26 at each end of the tool bar. At their forward or lower ends, each pair of bars 22 and 23 carry an axle 28 upon which the associated ground wheel 21 is journaled for rotation, and associated with each ground wheel 21 is a power lift clutch 30 of the self-interrupting or half-revolution type. A pair of cranks 31 and 32 are fixed to the ends of each axle 28 and these cranks act through a pair of upwardly extending links 33 to raise and lower the frame 11 whenever the clutch unit 30 is operated to rotate the cranks. The upper ends of the links 33 are connected to a pair of arm sections 35 and 36 rigidly connected to a rockshaft 37. The inner arm section 36 is extended to form a hand lever 38, and through detent mechanism (not shown) associated with the hand lever 38, the lifting rockshaft 37 may be rigidly fixed in position relative to the frame 11, thus determining the operating depth of the tools 13 when the cranks 31 and 32 are swung substantially through 180° from the position shown in Figure 1. The clutch unit 30 is controlled by a cable 41 that extends forwardly to the operator's station on the tractor or other means propelling the implement 10. The rear end of the cable 41 is connected to a lever 42 that is pivoted, as at 43, to an extension 44 that depends from the laterally outer bracket 26. An operating link 45 extends forwardly from the lever 42, being pivoted thereto at a point above the pivot 43, and is connected to control the clutch unit 30. It will be understood that there is a swingable wheel mounting 20 and clutch-controlling lever 42 and cable 41 at each side of the implement and for convenient operation the farmer usually interconnects the two cables 41 so that both clutches 30 may be operated with one hand.

The present invention is particularly concerned with the clutch mechanism included in the units 30 whereby neither of the clutch units 30 will be maintained in driving condition beyond a half revolution of the clutch mechanism and the associated ground wheel 21, even though the operator may perchance retain his hold on the cables 41. Each of the clutch units 30 mentioned above is provided with the non-repeat mechanism of the present invention, and the details of such mechanism will now be described.

Referring first to Figure 2, each clutch unit includes a casing 50 in which the shaft 28 is mounted for rotation. Connected to rotate with the associated wheel 21 is a hub-like member having a scalloped flange 52, this part forming the driving member of the clutch. Secured to the shaft 28 is a driven clutch member in the form of a plate 53 to which a clutch pawl 54 is pivoted, as at 55. The part 54 carries a roller 56 that is adapted, when released, to engage one of the notches of the scalloped flange 52 and thus connecting the driving and driven members of the clutch. The pawl 54 is urged by a spring 57 to move toward clutch-engaging position. A double-armed latch dog 58 is mounted for rocking movement about the axis of the shaft 28 and has one of its arm sections, shown at 59, extended and slotted, as at 61, to receive the pin 62 on which the roller 56 is disposed. The slot 61 is so angled relative to the detent or clutch pawl 54 that movement of the latch dog 58 about the axis of the shaft 28 in one direction or the other serves to shift the detent or pawl 54 between its clutch-engaged and clutch-disengaging positions. The other arm section of the latch dog 58 is indicated by the reference numeral 64 and is disposed generally in diametrically opposite relation with respect to the arm section 59. Each of these arm sections lies adjacent a notch 65 formed in the plate 53. Thus the plate 53 is provided with two generally diametrically opposite notches 65.

Figure 3:
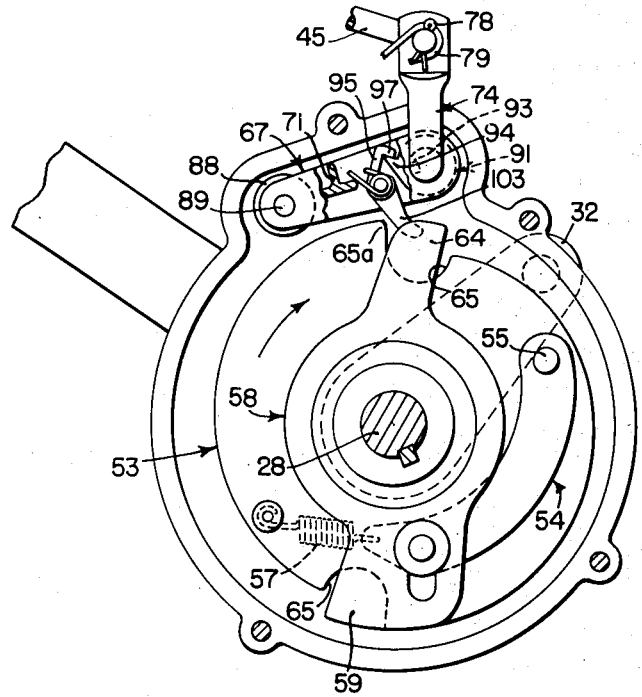
Figure 3 is a view similar to Figure 2 showing the clutch and associated parts in the positions they occupy when the trip lever has been actuated to connect the clutch parts for rotation together so as to lower the implement from the position shown in Figure 1 to an operating position.

The movement of the latch dog 58 is controlled by a control arm or member 67, best shown in Figures 2, 5 and 6. The control member 67 is preferably formed as a casting having strap-like sides 68 and 69 and a central connecting web portion 71, generally of T-shape in cross section, as best shown in Figure 3. The upper or outer ends of the sides 68 and 69 are apertured, as at 72, to provide for swingable mounting of the member 67 on the inner end portion 73 of an associated operating member in the form of a trip lever 74, the outer end section 75 of which is disposed outside the casing 50, which latter part includes suitable bearing means receiving the inner trip lever section 73. The trip lever section 75 is apertured, as at 76, to receive a laterally outturned end 77 of the actuating link 45. As best shown in Figures 1 and 3, the end 77 of the link 75 is apertured to receive a retaining cotter 78 which not only holds the link 45 connected with the member 74 but, additionally, retains in position the forward end of a spring 79 that at its rear end is connected, as at 81, to the swingable frame 20. The spring 79 is tensioned to yieldably urge the trip lever 74 in a counterclockwise direction, as viewed in Figures 1–4.

Referring again to the control member 67, whose connection with the trip lever 74 will be described in detail later, it will be seen from Figures 2 and 5 that the side member 69 is provided with an outwardly extending lug 81 of hook-like formation and receives one end of a spring 82 the other end of which is connected to a screw-threaded adjusting member 84 that is anchored in an apertured boss 85 carried by the casing, the member 84 having a pair of lock nuts 86 accessible exteriorly of the casing 50 for the purpose of adjusting the effective tension of the spring 82. The end of the control member 67 opposite the trip lever section 73 carries a clutch-controlling roller 88 mounted on a pin 89 that is supported in openings formed in the trip arm side sections 68 and 69. When the control member 67 is in the position shown in Figure 2, to which it is constantly urged by the spring 82, the roller 88 lies in one of the notches 65 and acts against the advancing edge of the associated clutch-controlling arm section, either 59 or 64, holding the latch dog 58 in the position shown in Figure 2, in which the clutch-engaging and disengaging roller 56 is held away from the scalloped section 52 of the clutch driving member. In this position, the latch dog 58 acts against the tension of the spring 57, which tends to swing the member 58 in a clockwise direction whenever the control member 67 is raised, as to the position shown in Figure 3.

The particular feature with which the present invention is especially concerned is the provision of means for automatically disconnecting the control member 67 from the trip lever 74 immediately following actuation of the clutch mechanism, whereby the clutch is automatically disengaged at the end of the cycle irrespective of the position of the trip lever 74 which, it will be remembered, is under the control of the manually operated part 42.

Referring now to Figures 5 and 6, a cam member 91 is connected, as by a pin 92 (Figs. 4 and 5) and a key 93 (Fig. 3), to the trip lever section 73 that is disposed within the casing 50. The cam member 91 is provided with a lug or extension 94 (Fig. 2) that is adapted to be engaged by a locking member in the form of a detent or latch 95. The member 95 is rockably mounted on a pin 96 carried in apertures in the side sections 68 and 69 of the trip arm 67 and is formed with a hook-like portion 97 that is adapted to engage the lug 94 on the cam member 91. A torsion spring 98 encircles the pin 96 adjacent one end thereof and includes one end 101 engaging the latch member 96 while the other end 102 bears against some convenient portion of the trip lever arm 67, such as the web 71. The function of the spring 98 is to swing the lock or latch member 95 in a clockwise direction, as viewed in Figures 2 and 4, so as to press the hook section 97 toward engagement with the cam member 91, these parts being shown in their engaged position in Figure 2. A tail portion in the form of an extension 103 is formed on the detent or latch 95, this portion extending toward the edge of the driven plate member 53 of the clutch 30.

The operation of the mechanism of the present invention is substantially as follows:

When the operator pulls on the cables 41, each of the manually operated levers 42 will be swung forwardly at the forward ends, which will exert a forwardly directed thrust through the associated link 45 to swing the associated trip lever 74 in a clockwise direction, as viewed in Figure 2. Assuming that the implement is raised into its transport position, with the parts arranged as shown in Figures 1 and 2, this clockwise movement of the trip lever 74 will act through the cam member 91 and the locking member 95, which in this position of the part is engaged with the lip or lug 94, to raise the control member 67 and its roller 88 out of operative connection with the driven plate 53 of the clutch. As soon as the roller 88 clears the associated arm section 64 (Figure 2), the spring 57 becomes effective to pull the clutch-engaging roller 56 into engagement with the flanged section 52 of the clutch-driving member, whereupon the clutch will be engaged and a forward rotation of the wheel 21 will be transmitted directly to the shaft 28, thus turning the cranks 31 and 32 in a clockwise direction relative to the lower end of the swingable member 20.

Figure 4:
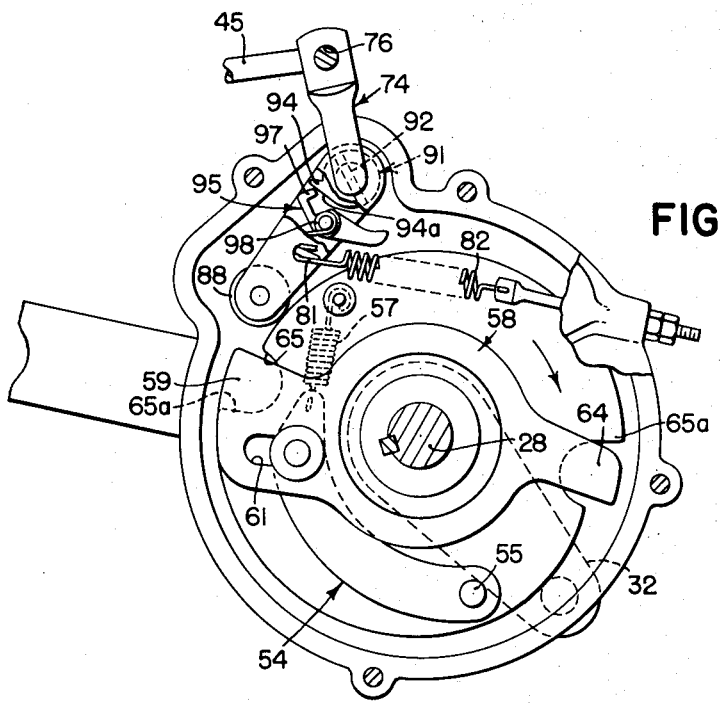
Figure 4 is a view, similar to Figures 2 and 3, showing the operation of the non-repeat mechanism and the position of the parts after said mechanism has acted to disconnect the trip lever from the clutch control member.

Referring now to Figure 3, it will be seen that as soon as the driven clutch member 53 has been rotated a few degrees, the radially outwardly extending portion 65a of the notch 65 will come into engagement with the extension section 103 of the detent latch 95, whereupon continued rotation of the driven clutch member in a clockwise direction (Figure 3) will act to swing the locking member 95 in a counterclockwise direction, thus disengaging the hook portion 97 of the member 95 from the extension 94 on the cam member 91. As soon as this disconnection is effected, the control member 67 is freed of its connection with the manually operated trip lever 74 and the spring 82 immediately swings the control member 67 in a counterclockwise direction toward the driven member 53 of the clutch so that, as shown in Figure 4, even though the operator should maintain his hold on the cables 41, which, in turn, holds the trip lever 74 in its forward position, the roller 88, riding along the peripheral edge of the driven clutch member 53, will be in a position to engage the other arm section 59 of the latch dog 58, stopping movement of the latter member and thus disengaging the clutch by shifting the roller 56 out of connection with the clutch-driving member 52. As soon as clutch disengagement is effected, the roller 88 is in a position to enter the associated notch 65 (Figure 4), and thus stop any further movement of the driven clutch member 53, the control member 67 moving into clutch-disengaging position by the force exerted thereagainst by the spring 82. When, at any subsequent time, the operator releases his hold on the cables 41, the spring 79 of each clutch mechanism acts to swing the trip lever 74 in a counterclockwise direction and, during this movement, the lower cam face 94a (Figure 4) will ride along the upper end portion 94 of the locking member 95, forcing the upper end of the latter generally rearwardly until the hook section 97 may again engage over the extension 94 on the cam member 91, thus against reconnecting the control member 67 with the trip lever 74.

From the above description, it will be seen that the mechanism of the present invention provides a non-repeat action, whereby the clutch mechanisms 30 cannot operate more than a half revolution, even though the operator should not release the trip lever 74. Further, it will be seen that the control member is automatically connected with the trip lever after the clutch has been actuated through a half revolution, just as soon as the operator releases his hold on the cable 41 and permits the spring 79 to swing the associated parts rearwardly. It will also be observed that the non-repeat mechanism of the present invention is substantially entirely enclosed within the clutch casing, and therefore the parts are located where they can be adequately lubricated and their proper interaction assured, irrespective of any excessively trashy or dusty conditions under which the implement is operated, since the enclosure of the mechanism within the casing fully protects all of the parts against fouling and contamination by dirt, dust, trash and the like. Further, the parts of the non-repeat mechanism and associated structure are of such construction that the manufacture thereof can be held to close tolerances and the machining of the parts, where necessary, is a relatively simple and inexpensive operation.

Figure 7:
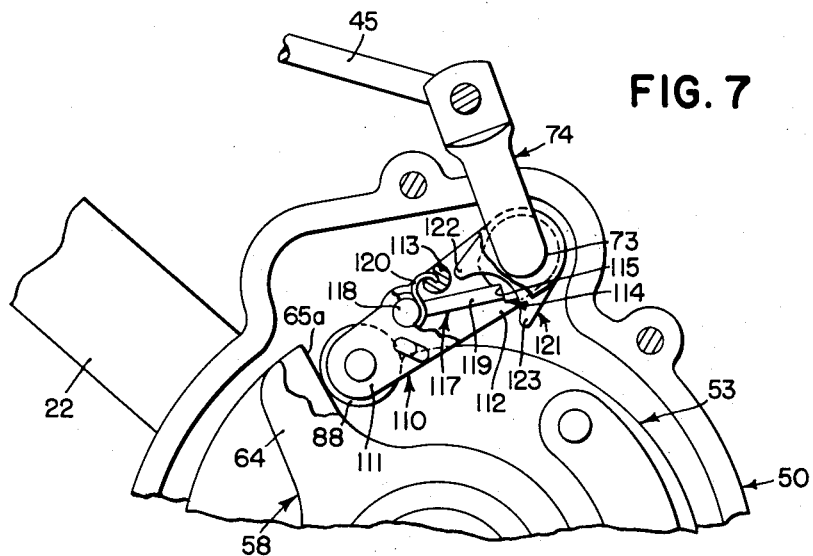
Figure 7 is a fragmentary view, similar to Figure 2, showing a modified form of the present invention.
Figure 8:
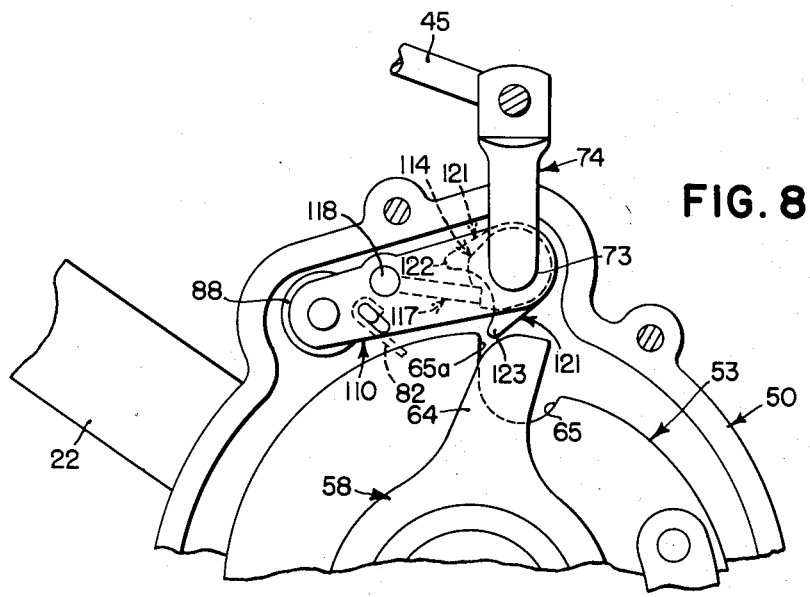
Figure 8 is a view similar to Figure 7, showing the positions of the several parts of the clutch unit when the latter is operating to raise or lower the implement.

A modified form of the present invention is shown in Figures 7 and 8. Referring now to these figures, parts that are, in general, common with those described above will be indicated by the same reference numerals. In this form of the invention the control member 110 is generally similar to the control member 67, including side sections 111 and 112 and pivotally mounted on the inner end section 73 of the trip lever 74. The side sections 111 and 112 are joined by an interconnecting web 113, and a cam member 114 is fixed to the trip lever section 73. The cam member 114 is provided with a latch-engaging abutment section 115. A latch or locking member 117 is swingably mounted on a pin 118 carried by the control member 110 and is urged into a position engaging the web section 113 by a torsion spring 120. As shown in Figure 7, the latch member 117 has its outer end section 119 lying in abutting relation with the shouldered portion 115 on the cam member 114, thus locking the control member 110 to the trip lever 74. Rockably mounted on the trip lever section 73 between the side sections 111 and 112 of the control member 110 is a detent controlling member 121 having upper and lower extensions 122 and 123 disposed generally on opposite sides of the detent abutment section 119.

In operation, referring first to Figure 7, when the operator pulls on the associated cable 41, the trip lever 74 is rocked in a clockwise direction, and this acts through the shoulder 115 and the detent end 119 to raise the control member 110 out of engagement with the latch dog 58 of the clutch, thereby permitting the clutch to engage and rotate the driven member 53 of the clutch. However, as the part 53 starts to rotate, the portion 65a of the member 53 comes into contact with the extension 123 of the member 121 and continued rotation of the member 53 thus causes the member 121 to be swung in a counterclockwise direction, the upper section 122 of which then forces the abutment section 119 of the latch 117 out of engagement with the shoulder 115, whereupon the spring 82 immediately swings the control member 110 into engagement with the peripheral edge of the member 53 and in a position to disengage the clutch as soon as its half rotation has been completed, even though, as shown in Figure 8, the operator retains his hold on the cable 41 and holds the trip lever 74 in its clutch-engaging position.

While I have shown and described above the preferred structure in which the principles of the present invention have been incorporated, it is to be understood that my invention is not to be limited to the particular means, shown and described above, but that, in fact, widely different means may be employed in the broader aspects of my invention.

What I claim, therefore, and desire to secure by Letters Patent is:

1. Non-repeat mechanism for the power lift clutch of an agricultural machine or the like of the type including driving and driven parts and a control member biased to cause disengagement of said parts, said mechanism comprising an operating member movable adjacent said control member, means on one of said members and movable thereon into and out of a position engaging the other member, resilient means acting against said last mentioned means and carried by said control member for urging said movable means into a position interconnecting said operating and control members, and an extension carried by said movable means and adapted to be engaged by one of said clutch parts and moved thereby into a position disconnecting said members.

2. A non-repeat self-interrupting clutch for agricultural machines and the like, comprising driving and driven parts adapted to be connected and disconnected, a casing enclosing said parts, means in said casing connected with said parts and biased to move into a position connecting said parts, a trip lever having one end pivotally carried by and extending into said casing, a control arm pivotally mounted on said end of the trip lever and disposed in said casing in one position to engage said biased means and hold the latter out of its parts-connecting position, spring means connected with said casing and said control arm for yieldably holding the latter in said one position, means within said casing and releasably connecting said control arm and trip lever, whereby the latter may be moved to shift said control arm out of said one position and thereby connect said parts, and means on one of said parts and engageable with said releasable means upon movement of said one part and thereby disconnect said control arm from said trip lever.

3. The invention set forth in claim 2, further characterized by said releasable means comprising a part fixed to said trip lever adjacent said control arm and having a projection thereon, a lock member pivoted to said control arm and having abutment means adapted to receive said projection, spring means acting between said control arm and said lock member for urging the latter into engagement with said projection, thereby connecting said trip lever with said control arm so that the latter may be operated by said trip lever, and an extension on said lock member extending into the path of movement of said driven part so as to be moved by the latter to disengage said lock member from said trip lever part and thus disconnect the trip lever from said control member.

4. Non-repeat mechanism for the power lift clutch of an agricultural machine or the like, wherein said clutch includes a casing, driving and driven parts and a control member mounted therein and biased to move about a pivot axis to a position to cause disengagement of said parts, said non-repeat mechanism comprising a trip lever adapted to be mounted in said casing for movement about said axis, a locking member adapted to be pivoted to said control member at a point spaced from said axis and movable into and out of a position locking said trip lever to said control member, means connected with said trip lever to cause the latter to move said control member against its bias and cause engagement of said driving and driven parts, and means connected with said locking member and including a portion adapted to be shifted by movement of one of said clutch parts and thereby disengage said trip lever from said control member whereby the latter may return to its clutch-disengaging position irrespective of the position of said trip lever.

5. In a self-interrupting clutch, the improvement comprising a trip lever, a clutch control member pivotally connected with said trip lever, a part fixedly connected with said trip lever, a locking member pivoted on said control member and biased to releasably engage said part, and an extension on said locking member for moving the latter out of engagement with said trip lever part.

6. In a self-interrupting clutch of the type including a casing, the improvement comprising a trip lever, having an end rockably mounted in said casing, a clutch control member pivotally mounted on said trip lever end within said casing, a part fixed to said trip lever end, a locking member pivoted on said control member and biased to releasably engage said part, and an extension on said locking member for moving the latter out of engagement with said trip lever part.

7. In a self-interrupting clutch of the type including a casing, the improvement comprising a trip lever having an end rockably mounted in said casing, a clutch control member comprising laterally spaced apart sections apertured and rockably mounted on said end of the trip lever, a part fixed to said trip lever end between said spaced apart sections, a locking member pivotally mounted on said control member between said spaced apart sections and having means releasably engageable with said part, spring means acting between said locking member and said clutch control member for urging the locking member into engagement with said part, and means connected with said locking member for moving the latter out of engagement with said part.

8. The invention set forth in claim 7, further characterized by said last mentioned means including an extension on said locking member extending inwardly of the clutch casing between said spaced apart sections of said control member.

9. In an agricultural implement, a self-interrupting clutch including an enclosing casing, a movable control part within said casing for controlling said clutch, resilient means within said casing and connected with the latter and said part for biasing said part for movement into a position disconnecting said clutch, means including disconnectible parts for moving said part against said bias into a position connecting said clutch, one of said parts including pivoted locking means having an end extending into the casing toward said clutch, and means carried by said clutch engageable with said end for shifting the latter and disconnecting said disconnectible parts so as to permit said control part to be moved by said bias into a position disconnecting said clutch.

10. The invention set forth in claim 9, further characterized by said pivoted locking means being mounted on said movable control part, the other of said disconnectible parts and said pivoted locking means having cooperating abutment sections whereby movement of said other part in one direction acts through said one part for shifting said movable control part in one direction.

11. The invention set forth in claim 10, further characterized by said other of said disconnectible parts having a cam section whereby said other part may move relative to said pivoted locking means into a position bringing said abutment sections into motion-transmitting relation.

References Cited in the file of this patent

UNITED STATES PATENTS

| | | |
|---|---|---|
| 2,119,757 | Strandlund | Jan. 7, 1938 |
| 2,270,968 | Riemenschneider | Jan. 27, 1942 |

FOREIGN PATENTS

| | | |
|---|---|---|
| 17,419 | Great Britain | July 22, 1910 |